(12) United States Patent  (10) Patent No.: US 8,707,949 B2
Hoffman  (45) Date of Patent: Apr. 29, 2014

(54) TRACKING SOLAR PANEL MOUNT

(76) Inventor: James Theodore Hoffman, Alameda, CA (US)

( * ) Notice: Subject to any disclaimer, the term of this patent is extended or adjusted under 35 U.S.C. 154(b) by 587 days.

(21) Appl. No.: 12/870,846

(22) Filed: Aug. 29, 2010

(65) Prior Publication Data

US 2011/0048406 A1    Mar. 3, 2011

Related U.S. Application Data

(60) Provisional application No. 61/238,162, filed on Aug. 29, 2009.

(51) Int. Cl.
*F24J 2/38* (2006.01)
*H01L 31/042* (2006.01)

(52) U.S. Cl.
USPC .................. 126/600; 126/604; 136/246

(58) Field of Classification Search
USPC .................. 126/600, 604; 136/246
See application file for complete search history.

(56) References Cited

U.S. PATENT DOCUMENTS

| | | | | | |
|---|---|---|---|---|---|
| 2,147,347 | A | * | 2/1939 | Jury | 248/456 |
| 2,405,877 | A | * | 8/1946 | Delano | 202/234 |
| 4,044,752 | A | * | 8/1977 | Barak | 126/581 |
| 4,063,543 | A | * | 12/1977 | Hedger | 126/579 |
| 4,129,360 | A | * | 12/1978 | Deflandre et al. | 359/853 |
| 4,158,356 | A | * | 6/1979 | Wininger | 126/579 |
| 4,185,615 | A | * | 1/1980 | Bottum | 126/601 |
| 4,226,256 | A | * | 10/1980 | Hawley | 136/244 |
| 4,226,502 | A | * | 10/1980 | Gunzler | 126/574 |
| 4,235,222 | A | * | 11/1980 | Ionescu | 126/579 |
| 4,283,588 | A | * | 8/1981 | Zitzelsberger | 136/246 |
| 4,306,541 | A | * | 12/1981 | Morrison et al. | 126/580 |
| 4,328,789 | A | * | 5/1982 | Nelson | 126/579 |
| 4,351,319 | A | * | 9/1982 | Robbins, Jr. | 126/580 |
| 4,421,943 | A | * | 12/1983 | Withjack | 136/246 |
| 4,452,234 | A | * | 6/1984 | Withjack | 126/627 |
| 4,459,972 | A | * | 7/1984 | Moore | 126/600 |
| 5,228,924 | A | * | 7/1993 | Barker et al. | 136/246 |
| 5,317,145 | A | * | 5/1994 | Corio | 250/203.4 |
| 5,762,720 | A | * | 6/1998 | Hanoka et al. | 136/251 |
| 5,833,178 | A | * | 11/1998 | Plasse et al. | 248/27.8 |
| 6,960,717 | B2 | * | 11/2005 | Stuart et al. | 136/246 |
| 7,240,674 | B2 | * | 7/2007 | Patterson | 126/573 |
| 7,454,990 | B2 | * | 11/2008 | Hardcastle, III | 73/865.6 |
| 7,607,427 | B2 | * | 10/2009 | Yi et al. | 126/600 |
| 2010/0095955 | A1 | * | 4/2010 | Carrasco Martinez | 126/601 |

FOREIGN PATENT DOCUMENTS

EP       1241416 A2 *  9/2002  ............... F24J 2/38

* cited by examiner

*Primary Examiner* — Kenneth Rinehart
*Assistant Examiner* — William Corboy

(57) ABSTRACT

A solar panel mount that tilts the panel about one or more axes toward the direction facing the sun when it is shining, through the action of one or more mechanical means, each effecting tilt about at least one of the axes, and each responding to a particular direction of sunlight with respect to the base or panel, through directionally-sensitive solar radiation absorbing means. In one set of preferred embodiments the mechanical means are length-changing actuators in which a temperature-responsive working fluid drives levers to lift a side of the panel. In a second set of embodiments, the mechanical means are tension-changing actuators in which temperature-responsive folded springs retract to pull the panel to a side.

5 Claims, 12 Drawing Sheets

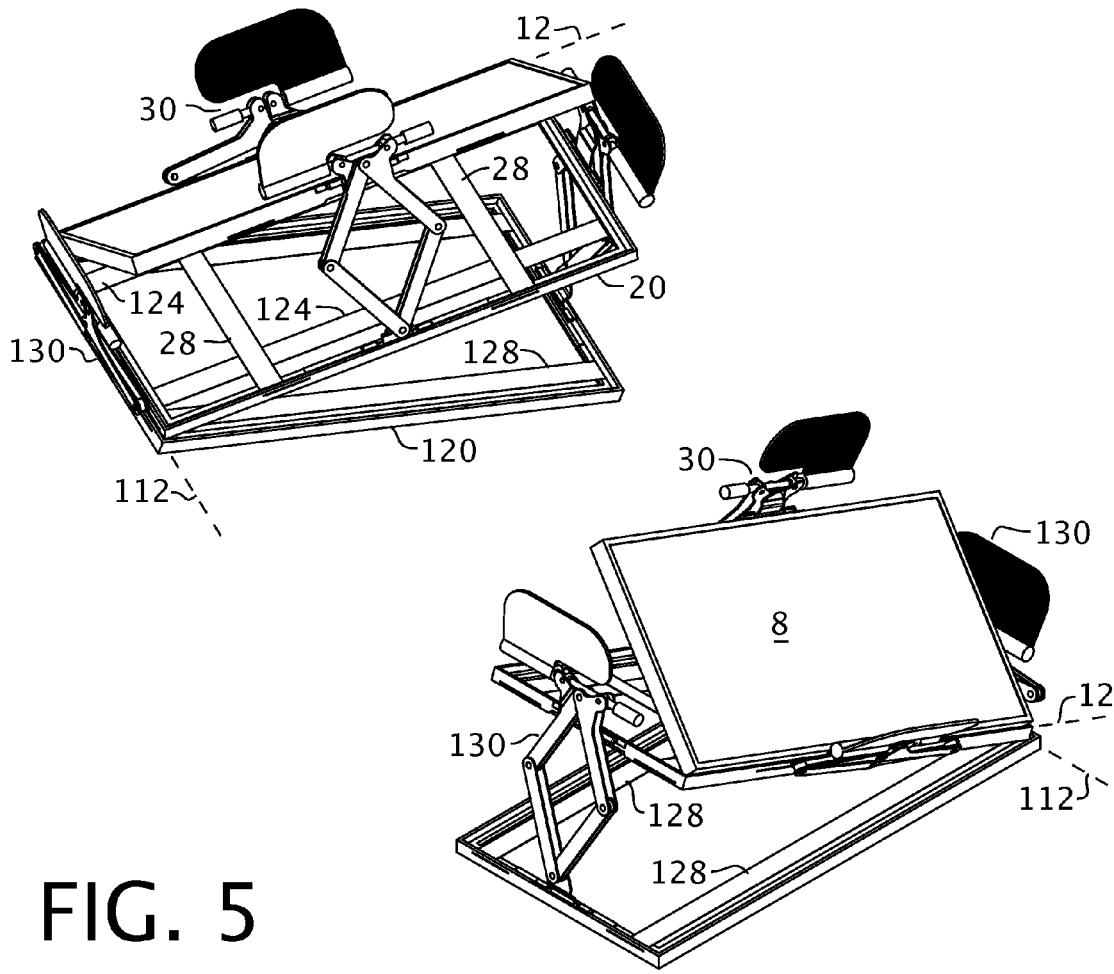
FIG. 5
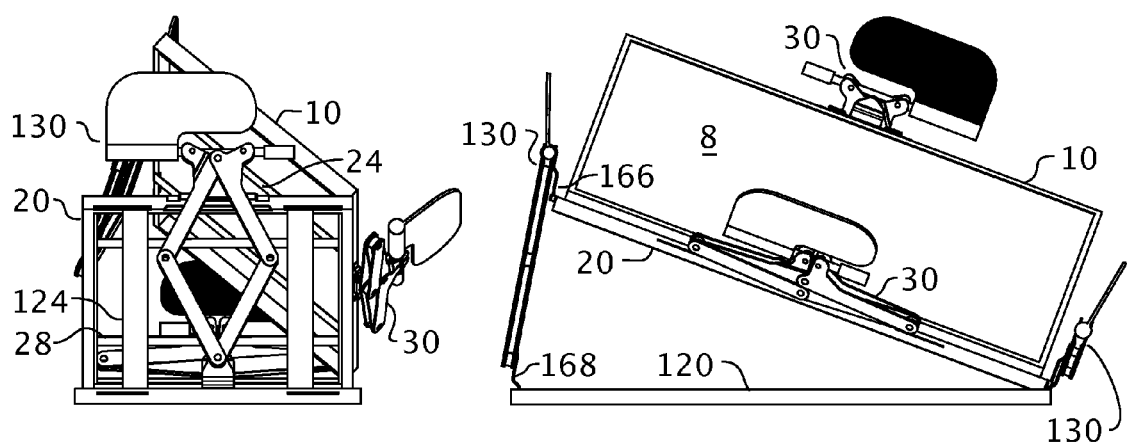

TRACKING SOLAR PANEL MOUNT

BACKGROUND FOR THE INVENTION

In most installations, solar panels are mounted in fixed positions, where they achieve maximum gain only at the particular time of day and year when the sun's direction matches the panels' normal axes. The mounting of solar panels on sun-tracking systems with one or two tilt axes, known in the art as heliostats, maximizes their utilization over daily and yearly cycles, both by increasing the aperture they present to the sun, and by maintaining a low angle of incidence of light falling on the panel and thereby reducing reflective losses. by maintaining a nearly angle However, at least three economic and mechanical factors limit the widespread adoption of such heliostatic mounts, particular in small rooftop installations: (1) the expense of tracking mounts and electronics; (2) the concomitant service requirements of the same; and (3) vulnerability to extreme weather, and aesthetic drawbacks resulting from the high profiles of existing heliostatic mounts.

The present invention addresses limitations of existing tracking mounts for solar panels through a combination of methods that provide single or multi-axis tracking using an economical yet robust mounting and tracking system and tilts the panel to face the sun when the sun is shining using simple solar-thermal and mechanical means. One embodiment provides the additional advantages of feathering the panel into a flush low-profile position when the sun is not shining or when high winds prevail.

SUMMARY OF THE INVENTION

The invention is a solar panel mount that pivots a panel about one or more tilt axes so as to increase its gain, where the pivoting about each such axis is controlled by one or more solar mechanical means, each having a directionally-selective solar mechanical device that controls its said means' elongation or retraction.

In the first embodiment described herein, the said solar mechanical device comprises levers operated by a thermally-responsive piston with a radiant energy capturer, mounted such that sunlight within a certain angular range with respect to one of the panel's two planes of symmetry heats the solar mechanical device and thereby lengthens it, lifting the adjacent side of the panel.

In the second such embodiment, the said solar mechanical device comprises a radiant-energy-capturing thermally-responsive tension-changing spring mounted such that sunlight within a certain angular range with respect to one of the mount's two planes of symmetry heats the said device and thereby increases its tension, pulling down the adjacent side of the panel.

The two embodiments described herein are also distinguished from each-other by using different means of pivotably mounting the panel assembly upon the base.

The first embodiment uses a pivoting means in which a mounting system constrains a ridge of a pivot frame to rest in a groove of a base frame and thereby forms a fulcrum and coincident tilt axis. It is referred to herein as a 'fulcrum-lift mount'.

One configuration of this mounting system enables the pivoting of a panel about any of four possible tilt axes—one corresponding to each of the panel's four edges. Because most solar panels have a long and a short dimension, the present description distinguishes tilt axes as being either long—corresponding to the panel's long dimension, or short—corresponding to the panel's short dimension. The present description also distinguishes the four possible tilt axes as left and right long tilt axes, and top and bottom short tilt axes.

The mounting system can be configured so as to provide pivoting of a solar panel about any combination of the four possible tilt axes, where pivoting about each operable axis is controlled by a lifter mounted along the side of the panel opposite the tilt axis. The simplest form of the mounting system has a single tilt axis, pivoting about which is provided by a single lifter. The mount required to provide pivoting about two parallel axes, for example left and right tilt axes, is only slightly more complex than that required to provide pivoting about a single axis, requiring little more than the addition of a lifter.

The mounting system that enables pivoting about both the long and short axes of a panel essentially consists of nesting the mechanism providing pivoting about either or both of the long axes within a similar mechanism providing pivoting about either or both of the short axes.

The second embodiment employs a pivoting means wherein the panel assembly is supported upon the base frame through a universal joint situated just under the panel, and atop a shallow peak rising in the middle of base structure. The universal joint, whose pivot axes are parallel to the short middle axis of the panel and the long middle axis of the base, allows the panel assembly to tilt about any axis parallel to the base plane, while not allowing it to twist. This mounting method is referred to herein a 'rocker mount'.

SUMMARY OF THE DRAWINGS

FIGS. 1 through 8 show forms and variants of the first embodiment, wherein the pivot mount uses a fulcrum-lift system.

FIG. 1 shows two views of a long-axis dual pivot mount tilted up slightly about its right axis.

FIG. 2 shows two views of a long-axis dual pivot mount in the retracted, level position.

FIG. 3 shows an exploded view of a long-axis dual pivot mount.

FIG. 4 shows an assembled and a partially exploded view of a lifter assembly.

FIG. 5 shows four views of a nested long- and short-axis pivot mounts.

FIG. 6 shows the nine operating modes of a nested long- and short-axis pivot mount.

FIG. 7 shows a cross-section and detail section of a nested long- and short-axis pivot mount.

FIG. 8 shows a variant of the first embodiment in whose thermal capture elements are enveloped.

FIG. 9 shows two views of the panel mount in a neutral state.

FIG. 10 shows an exploded view of the panel mount.

FIG. 11 shows four views of the panel mount tiled about both of its pivot axes.

FIG. 12 shows views of the solar mechanical device of the second embodiment, including a cross-section detail.

DETAILED DESCRIPTION OF THE PREFERRED EMBODIMENTS

This detailed description of exemplary embodiments of the invention presents examples of the first and second embodiments. It first presents an example of a fulcrum-lift mount having a dual long-axis pivot mechanism using solar mechanical devices that separably link corresponding sides of the base and panel assembly. It then presents an example of such a mount having a dual long-axis pivot mechanism nested within a dual short-axis pivot mechanism. The second example differs from the first only by the addition of the parts comprising the short-axis pivot mechanism, or lower pivot mount, which supports the long-axis pivot mechanism, or upper pivot mount. Finally, the present description presents an example of a rocker mount having a two-axis pivot mechanism using solar mechanical devices that tensionally link corresponding sides of the base and panel assembly.

Long-Axis Fulcrum-Lift Mount with Piston Actuators

Figure 1A:
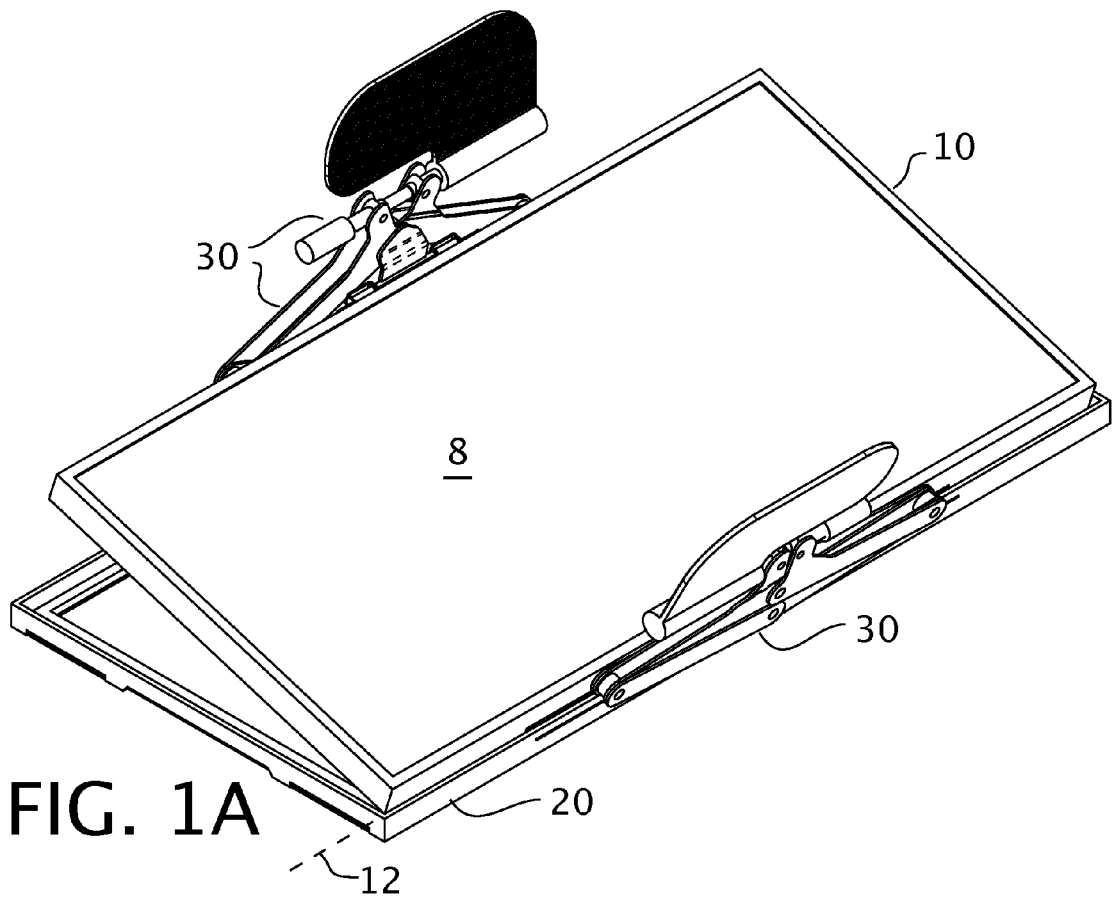
Figure 1B:
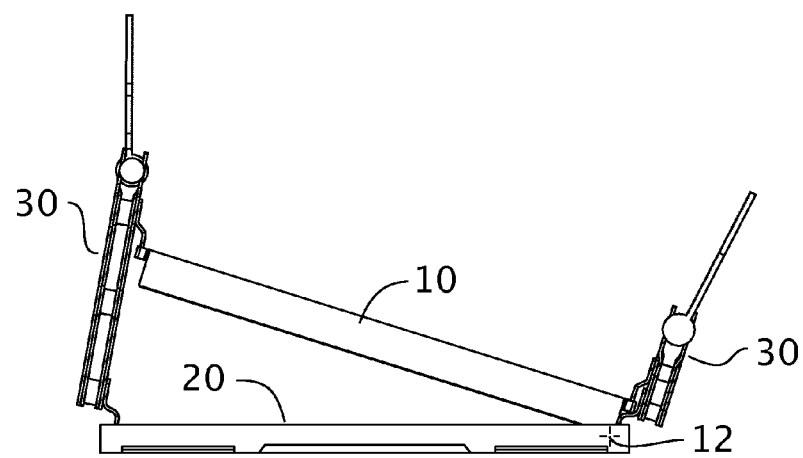

FIG. 1 shows views of a long-axis dual pivot mount in which the panel assembly, consisting primarily of the panel 8 and panel frame 10, is tilted up slightly with respect to the pivot frame 20 about its right tilt axis 12. FIG. 1A shows an isomeric view of the assembly, and FIG. 1B shows a view in which the dual tilt axes are perpendicular to the sheet.

Figure 2A:
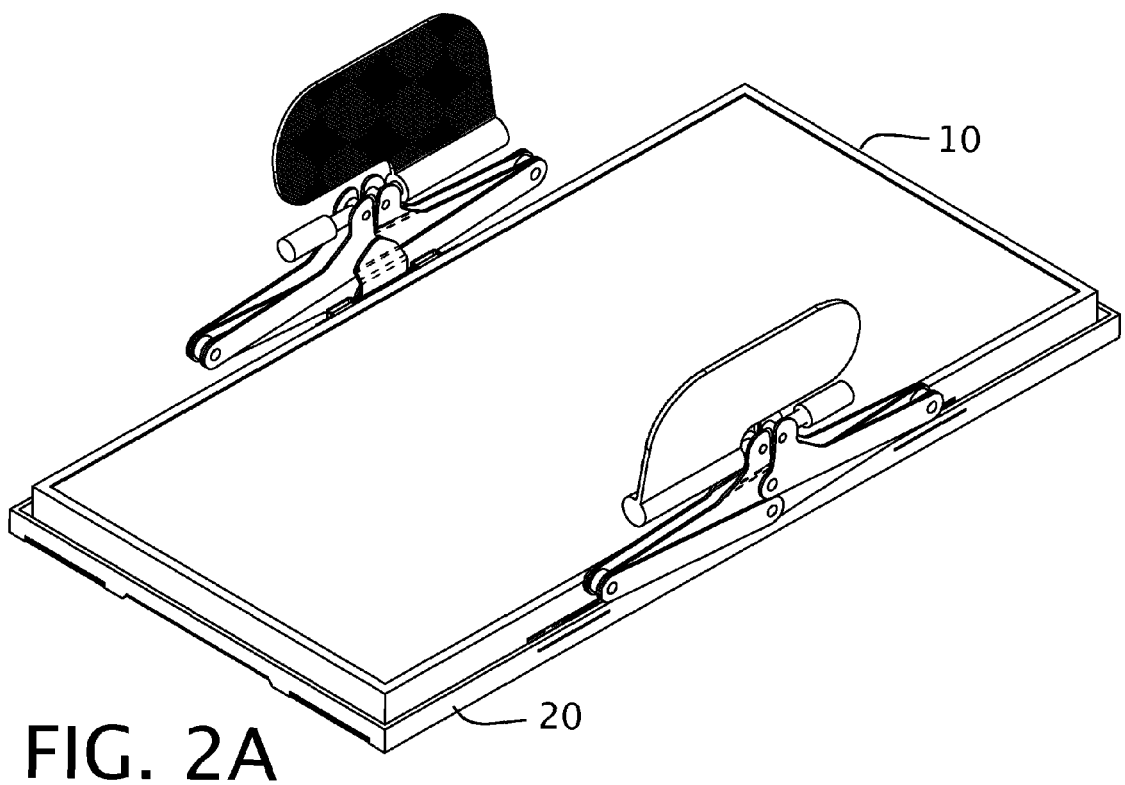
Figure 2B:
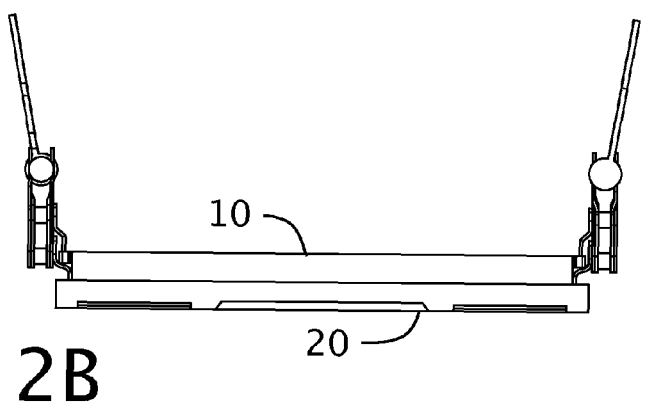
Figure 3:
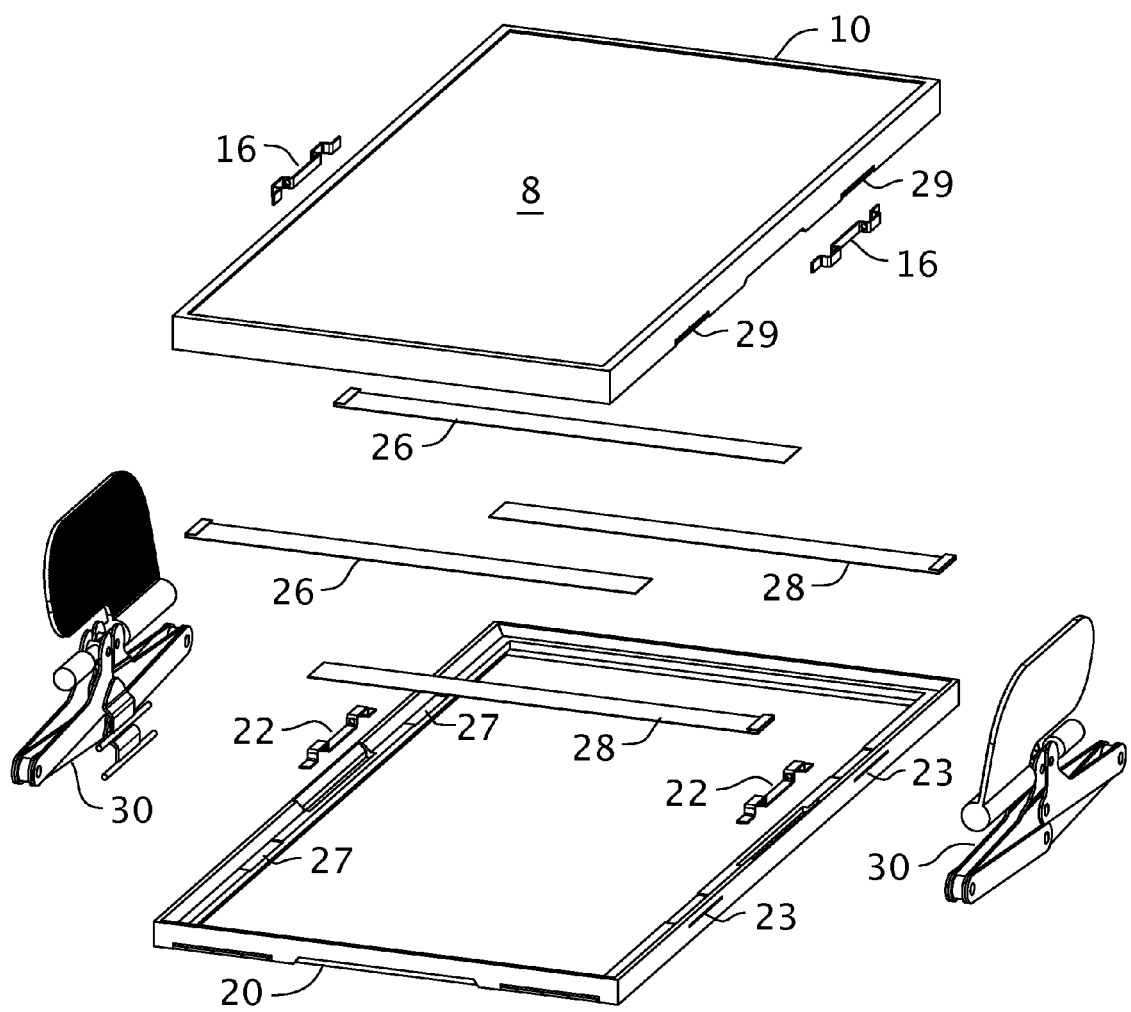

FIG. 2 shows two views of the same assembly shown in FIG. 1 but in the retracted, level position. FIG. 2A shows an isomeric view of the assembly, and FIG. 2B shows a view in which the dual tilt axes are perpendicular to the sheet FIG. 3 shows a dimetric exploded view of a long-axis dual pivot mount shown in FIGS. 2 and 3. The connections of the various major components are described with reference to this figure.

The right pivot straps 26 and left pivot straps 28 are shown suspended between the panel assembly above, and the pivot frame 20 below. When assembled, the pivot straps connect the panel frame 10 to the pivot frame 20. The right ends of the right pivot straps 26 are anchored in the right pivot fulcrum anchor slots 23 and their left ends are anchored in the right pivot end anchor slots (hidden from view). The left ends of the left pivot straps 28 are anchored in the left pivot fulcrum anchor slots 27 and their right ends are anchored in the left pivot end anchor slots 29. The pivot straps are composed of a thin flexible material with a high tensile strength such as steel, and are installed into the anchor slots under a slight tension. Because of the configuration of the straps, the panel assembly can be tilted up about the right tilt axis or about the left tilt axis, but not about both axes simultaneously.

The pivoting of the panel assembly about each tilt axis is controlled by the lifters 30. Pivoting about the left tilt axis is effected by the right lifter, and pivoting about the right tilt axis is effected by the left lifter. The lifters are articulated to the panel frame 10 through the mounting of the lifter pull handles 66 in the pull handle mounts 16 rigidly attached to the panel frame, and are articulated to the pivot frame 20 through the mounting of the lifter push handles 68 in the push handle mounts 22 rigidly attached to the pivot frame. The lifter handles are pivotably mounted in their respective handle mounts, allowing the lifters to tilt as required to accommodate the angle made by the push and pull handle mounts spanned by each lifter.

Figure 4A:
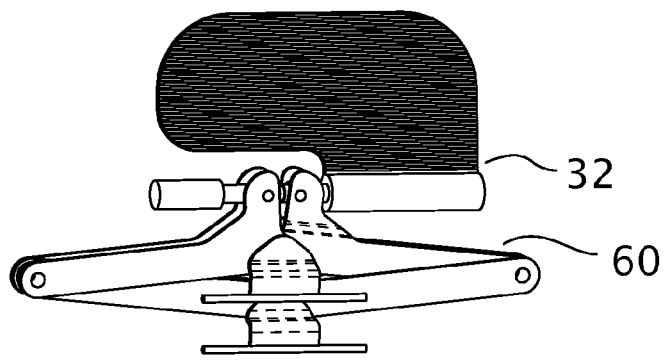
Figure 4B:
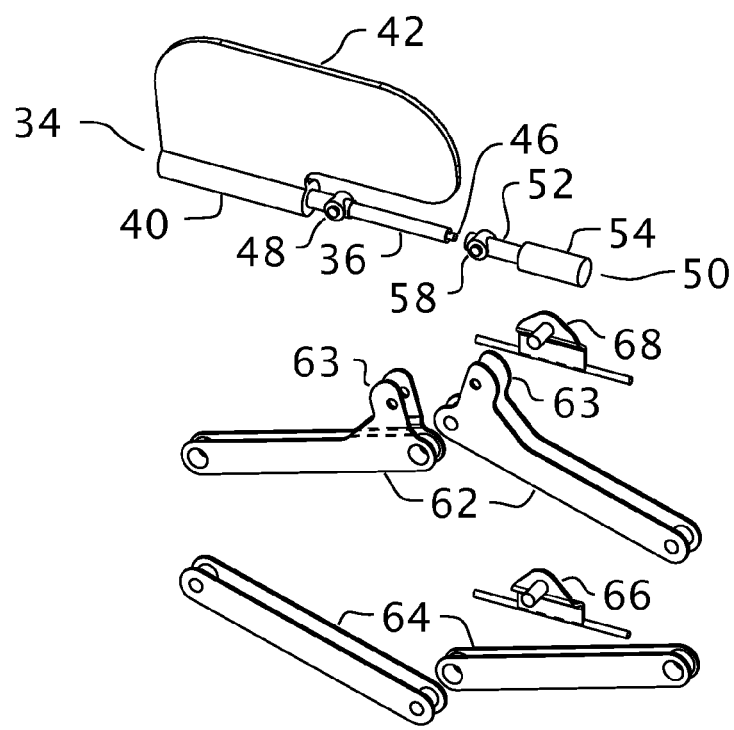

FIG. 4 shows views of a lifter assembly. FIG. 4A shows a view of an assembled lifter from the side facing the panel, called its front side, and FIG. 4B shows an exploded view a lifter from the side facing away from the panel, called its back side.

The lifter consists of two main subassemblies: the lift engine 32, and the jack assembly 60. The lift engine responds to sunlight falling on its absorptive side, shown in FIG. 4A, by elongating laterally, thereby increasing the height of the jack assembly to which it is articulated, and increasing the distance between the pull handle 68 and the push handle 66.

The lift engine 32 has two main components that move relative to each other along a common axis: the piston assembly 34 and the spring assembly 50. The piston assembly comprises the piston mount 36, a thermal fluid chamber 40 filled with a working fluid, the integral radiant energy capture paddle 42, and a piston and piston rod 46.

The spring assembly comprises the spring mount 52, the spring chamber 54, and the spring (hidden from view). The spring mount ensleeves the piston mount, allowing the piston and spring assemblies to move relative to each other along the common axis of the piston, piston mount, spring, and spring mount.

When the spring and piston assemblies are joined and moved toward each other along their common axis, the spring is forced into compression and the piston is forced into its retracted position. The elevation of the temperature of the working fluid within its chamber produces force on the piston and its rod pushing the assemblies apart, aided by the compressive force of the spring.

The jack assembly 60 comprises four elongate members: two lever arms 62 and two connector arms 64; and the pull and push handles 66 and 68. Each of the arms is built up of two flat plates rigidly connected to each other by a pair of short cylinders, one at each end of the arm. The cylinders of one of the lever arms and one of the connector arms are shorter axially and larger in diameter than those of the other two arms. The arms are pivotably articulated to form a flexible rhombic-shaped assembly through the concentric mounting of the cylinders of adjacent arm ends with the larger- and smaller-diameter cylinders acting as bearings and journals, respectively.

The pull and push handles 66 and 68 are pivotably articulated with the lever arms 62 and the connector arms 64, respectively, through the concentric mounting of the short pegs extending from the upper portion of each handle within bearings formed by the interiors of the smaller-diameter cylinders at the top and bottom of the rhombic arm assembly, respectively.

The lift engine is articulated with the jack assembly through the mounting of short lateral pegs 48 and 58 integral to the piston mount 36 in holes within tabs 63 of the plates of one lever arm and the mounting of short lateral pegs integral to the spring mount 52 in holes within tabs 63 of the plates of the other lever arm. When piston and spring mounts are forced apart through the heating of the working fluid in the fluid chamber, the tabs of the opposing lever arms are forced apart thereby forcing the rhombic lever assembly to elongate in the vertical direction.

Each lift engine is mounted so that its radiant energy capture paddle will collect sufficient heat to elongate its associated jack assembly only when the angle formed by the direction towards the sun and the direction from the panel's center toward the lifter parallel to the panel's surface is obtuse.

The front side of the energy capture paddle shown in FIG. 4A is designed to capture sunlight as heat energy, whereas the back side of the paddle shown in FIG. 4B is designed to reflect sunlight. The invention contemplates a variety of methods for making the front surface of the paddle absorptive and the back surface reflective, including coating the back side with a reflective and/or thermally insulating material and coating the front side with an absorptive and/or thermally conductive material. The energy capture paddles pictured in the figures have back sides polished to have a reflective finish and front sides covered with narrow groves parallel to the paddles' long axes and coated with a flat black enamel. The groves on the paddles' front sides prevent the reflection of light from the paddles' surfaces even when the light has a low angle of incidence relative to said surfaces.

Because the lift engine exploits thermal energy to generate mechanical force, it produces elongation of its lifter that is a function of several factors relating to heat transfer including: the incidence angle of directional sunlight with respect to the front side of the radiant energy capture paddle, the ambient temperature, the velocity of ambient air, and thermal conduction through the assemblies connected to the lift engine. The preferred embodiments are designed such that the lift engine's elongation behavior is highly sensitive to direction of incident light, while having limited sensitivity to the ambient temperature, is inversely responsive to high winds, and is thermally insulated from other assemblies.

The invention contemplates several methods of making the lift engine relatively unresponsive to variations in ambient temperature within the normal range of such temperatures encountered in the mount's operating environment. The primary such method is to design the energy capture paddle to have sufficient gain that, when its front sides is illuminated by sunlight, it elevates the temperature of its associated fluid chamber well above the normal range of ambient temperatures, and using a working fluid whose primary expansion range is also above that normal temperature range. For example, given maximum illumination, the paddle might raise the temperature of the working fluid by 80 degrees F., and the working fluid might have a primary expansion range of 110 to 120 degrees F. A lift engine with such characteristics could function over an ambient temperature range of about 40 to 110 degrees F.

A second method of decreasing the sensitivity of the lift engine to variations in ambient temperature consists of enclosing at least the piston assembly portion of the lift engine in an insulating envelope whose front side is transparent, as described below with reference to FIG. 8. By reducing convective heat losses from the lift engine, such an envelope could increase the range of ambient temperatures over which the engine could operate.

The lift engine is inversely responsive to high winds in that heat captured by the radiant energy capture paddle is lost by convection when the lift engine is bathed by rapidly moving air produced by high winds. This effect is exploited to produce the desirable behavior of lowering the panel into its retracted, low-profile position in the event of high winds that might damage the assembly in a pivoted position. The shape of the paddle and/or its enclosing envelope can be designed to determine the wind speed above which convective heat losses cause the mount to retract its panel. For example, the envelope could have small fins or perforations that would allow significant cooling airflow over the paddle within it only when the wind speed exceeds 50 MPH.

Combined Long- and Short-Axis Fulcrum-Lift Mount with Piston Actuators

The combined long- and short-axis fulcrum-lift pivot mount essentially nests the long-axis pivot mount described above within a second, or lower, pivot mount, with its own pivot frame, pivot straps, and lifters, where the lower pivot mount is oriented perpendicular to and shaped slightly differently from the original upper mechanism.

FIG. 5 shows four views of the combined long- and short-axis pivot mount, where the panel and panel mount is pivoted up about its right tilt axis 12 to near its maximum tilt, and the upper pivot mechanism is pivoted up about its top tilt axis 112 to near its maximum tilt. The four views, in clockwise order, show the mount from its upper left side, its lower right side, its right side, and its bottom side.

Like the preceding figures, FIG. 5 shows the components of the upper pivot assembly, including the panel 8, the panel frame 10, the right pivot straps 24, the left pivot straps 28, the upper pivot frame 20, and the side lifters 30. In addition FIG. 5 shows the components of the lower pivot mechanism, including the top pivot straps 124, the bottom pivot straps 128, the lower pivot frame 120, and the end lifters 130.

The end lifters 130 of the lower pivot mechanism are identical to those of the upper pivot mechanism 30, except that the pull and push handles of the end lifters 166 and 168 are longer than those of the side lifters 66 and 68. The longer handles of the end lifters position their lift engines higher relative to their handle mounts than is the case with the side lifters, compensating for the lower relative positions of the end handle mounts, and for the shadows produced by the tilting of the panel and panel frame by the upper pivot mechanism.

Figure 6:
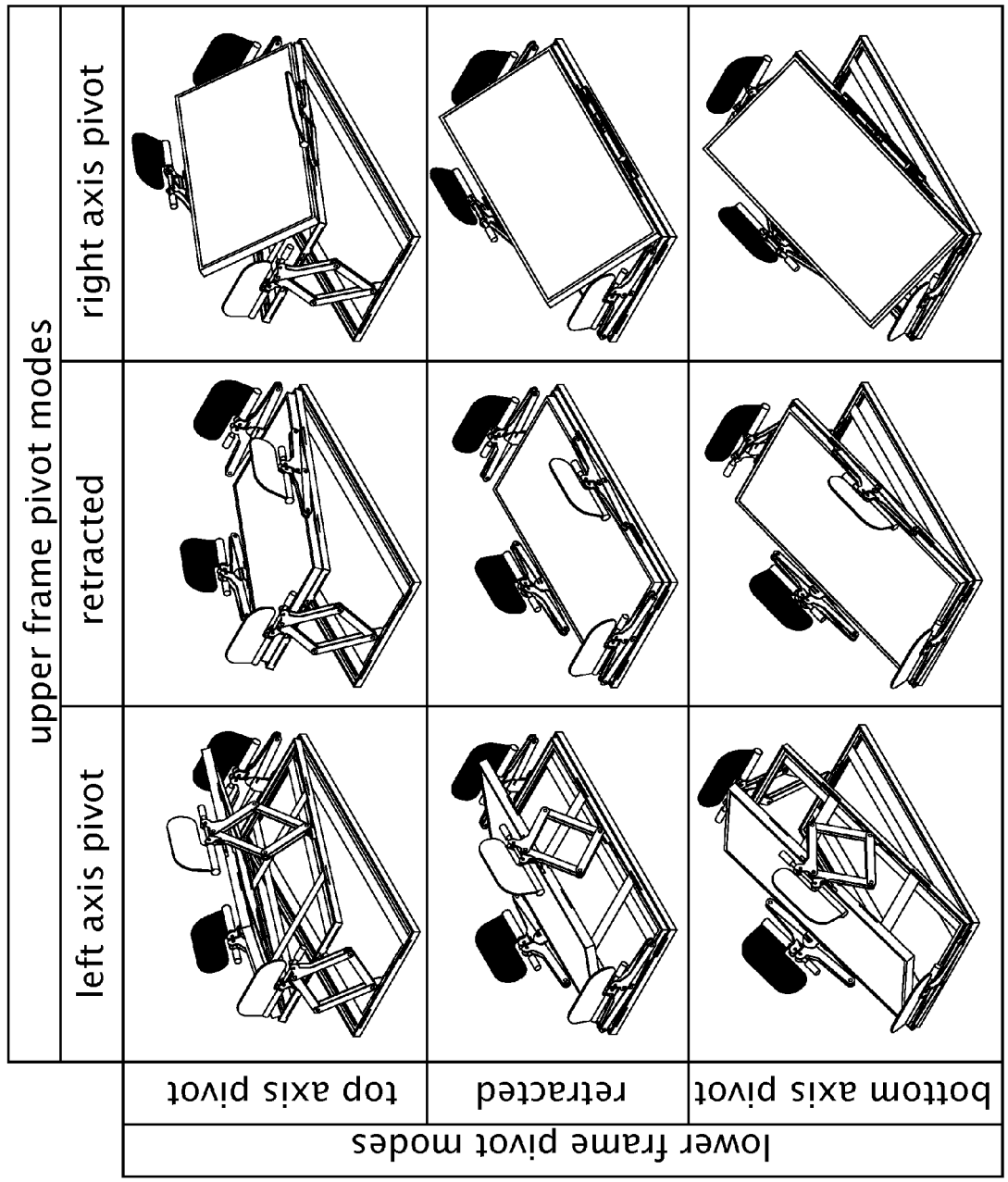

FIG. 6 shows the nine operating modes of the combined long- and short-axis pivot mount in the form of a table having three columns and three rows. The left, middle, and right columns show the upper pivot mechanism pivoting about the left tilt axis, not pivoting, and pivoting about the right tilt axis, respectively; and the top, middle, and bottom rows show the lower pivot mechanism pivoting about the top tilt axis, not pivoting, and pivoting about the bottom tilt axis, respectively.

Figure 7:
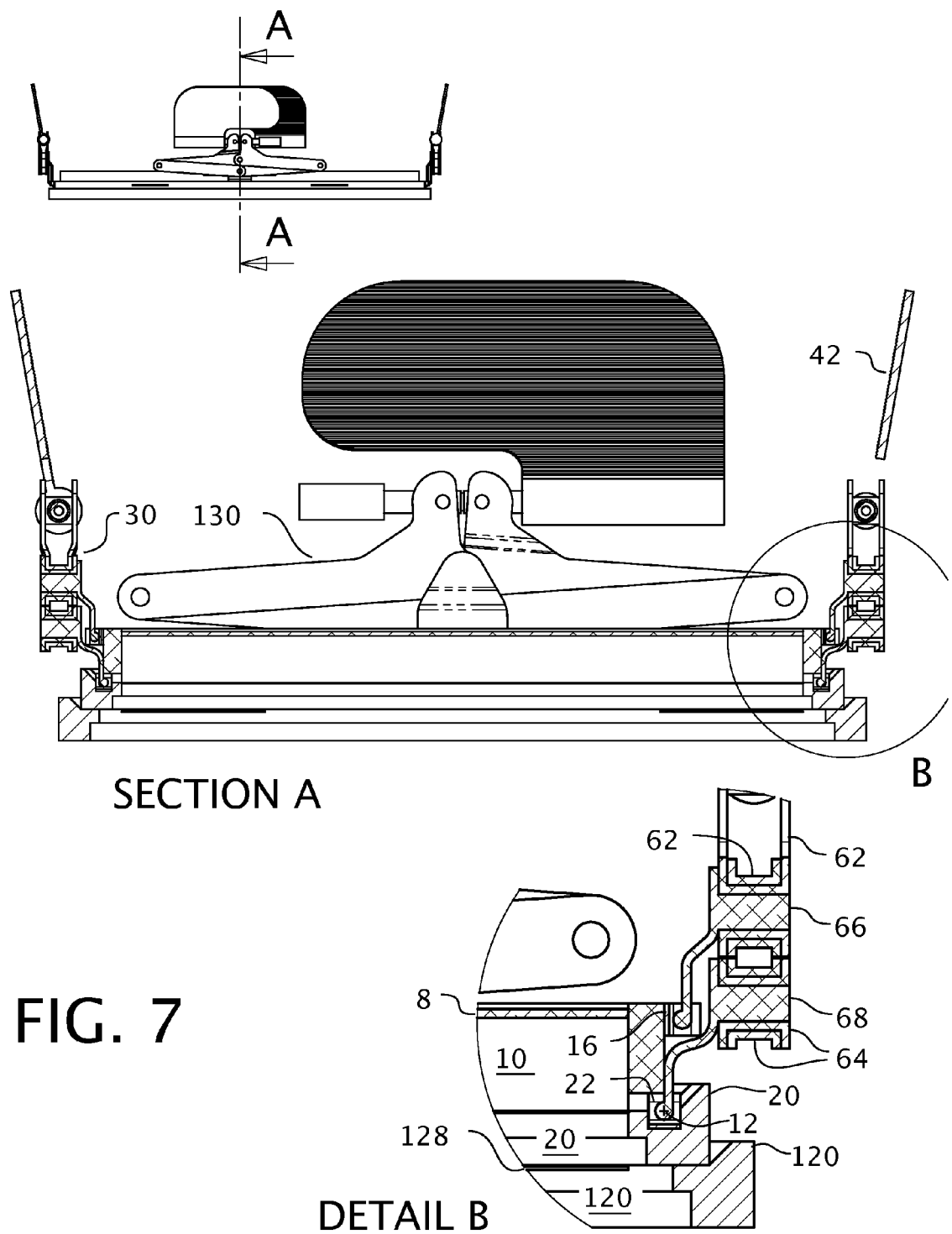

FIG. 7 shows a cross-section of the combined long- and short-axis pivot mount where both the upper and lower mechanisms are in the retracted position. The upper illustration shows the assembly from the left, the middle illustration labeled SECTION A shows the indicated cross-section through the middle of the assembly, and the lower illustration labeled DETAIL B shows the indicated detail view of the cross-section. Because the cross-section bisects the side lifters 30, it primarily reveals details about the upper, long-axis pivot mechanism.

The section views bisect the pull and push handles 66 and 68, showing how their short lateral pegs are mounted coaxially within the cylinders of the lever arms 62 and connector arms 64. The lower ends of the pull and push handles incorporate rods, seen in cross-section in FIG. 7, that are mounted in the pull and push handle mounts 16 and 22, respectively. The rod of the push handle 68 seen in DETAIL B is coaxial with the right tilt axis 12. As a result, when the panel assembly pivots about the right tilt axis, the said lifter pivots in the same manner, maintaining its geometric relationship with the panel.

Variants of the First Embodiment

The dual long-axis pivot mechanism described above provides pivoting of the panel about the parallel left and right tilt axis, and the combined dual long-axis and dual short-axis pivot mechanism described above provides pivoting of the panel about each of the parallel left and right tilt axis, and about each of the parallel top and bottom tilt axes. Other configurations of the embodiment can be used to provide pivoting about different subsets of the possible pivot axes. The replacement of a lifter along one of the mount's sides or ends with a bracket holding the adjacent pull and push handle mounts in proximity will disable the mechanism's pivoting about the axis on the mount's opposite side or end, while allowing pivoting about the tilt axis that is coaxial with the lower push handle under the action of the lifter on the mount's opposite side or end. Such a modification saves the expense of a lifter and reduces the profile of the mount at the expense of elimination the panel's ability to pivot along one axis. However, depending on the orientation of the platform upon which the mount is installed, pivoting about a given tilt axis may have limited utility. For example, a mount installed on a roof slope facing the southeast would gain very little from pivoting about the long axis on its east side, but would benefit greatly from pivoting about the long axis on its west side. Such an installation would be a good candidate for a long-axis pivot mount having lifters only on the mount's east side, providing pivoting about the tilt axis on its west side.

Another variation of the embodiments described above involves using mount that has only a short-axis pivot mechanism, eliminating the long-axis pivot mechanism. This variant is generally less useful than the single short-axis pivot mechanism shown in FIGS. 1 through 3, because, for a given height provided the lifter, the panel pivots through a smaller angular range. Another variant involves inverting the nesting order of long-axis and short-axis pivot mechanisms in a mount that combines pivoting about the perpendicular long and short axes, nesting the short-axis pivot mechanism atop the long-axis one.

Variant of the Piston Lift Engine

Figure 8A:
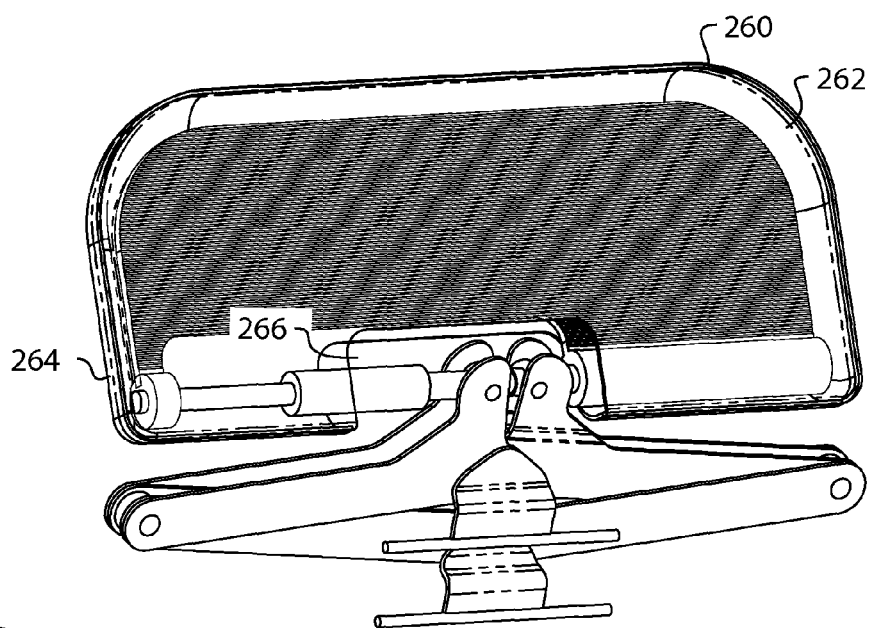
Figure 8B:
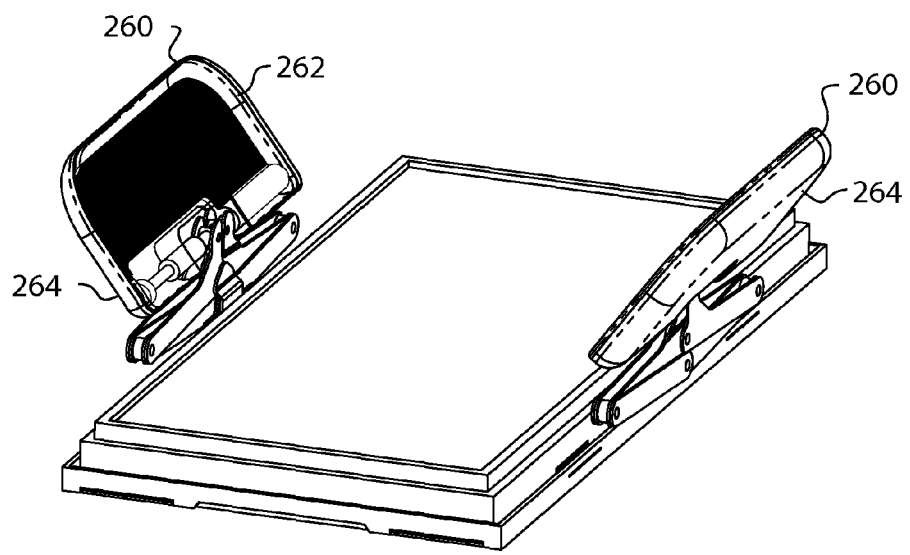

FIG. 8 shows a variant of the lift engine used in the first embodiment, in which the lift engine is enveloped by a shell 260. FIG. 8A shows a view of a lift assembly whose lift engine is equipped with said shell, and FIG. 8B shows a diametric view of a fulcrum-pivot mount equipped with two said lift engines.

The lift engine 232 is modified compared to the variant previously shown 32 to have a more symmetric overall shape, and to provide points around its periphery at which to firmly mount the shell. The shell has a transparent front side 262 and an opaque, reflective back side 264.

The said shell surrounds most of the lift engine but has the cut-out 266 to accommodate the articulations of the lever arms to the lateral pegs integral to portions of the lift engine. The cut-out also enables the exchange of air between the interior and exterior of the shell, at a rate that is proportional to wind speed.

The shell functions in several ways to enhance the mount's performance. The primary such function is to decrease the sensitivity of the lift engine to ambient temperature conditions while retaining its responsiveness to high wind conditions.

The said decrease in sensitivity to ambient temperature results from the insulation between the lift engine and the ambient air provided by the shell and the air trapped within it. This feature provides for more effective solar heating of the engine's front side in cold ambient conditions, while shading the engine's back side.

The said responsiveness of the lift engine to high wind conditions results from the design of the shell's cut-out to induce significant air exchange between the shell's interior and exterior and significant air flow around the engine when and only when the shell is bathed by wind. The cooling of the lift engine provided by such wind-induced convection causes the engine and its associated jack to retract, lowering the panel into its flush low-profile position.

A second benefit provided by the shell is to increase the incident light upon the panel at certain times by reflecting light from the shell's front side to the panel when that light strikes that side with a high angle of incidence. This feature exploits the property of transparent materials having a smooth surface wherein they transmit most light whose incidence angle is less than some threshold and reflect most light whose incidence angle is greater than a similar threshold.

Dual-Axis Rocker Mount with Solid-State Actuators

Figure 9A:
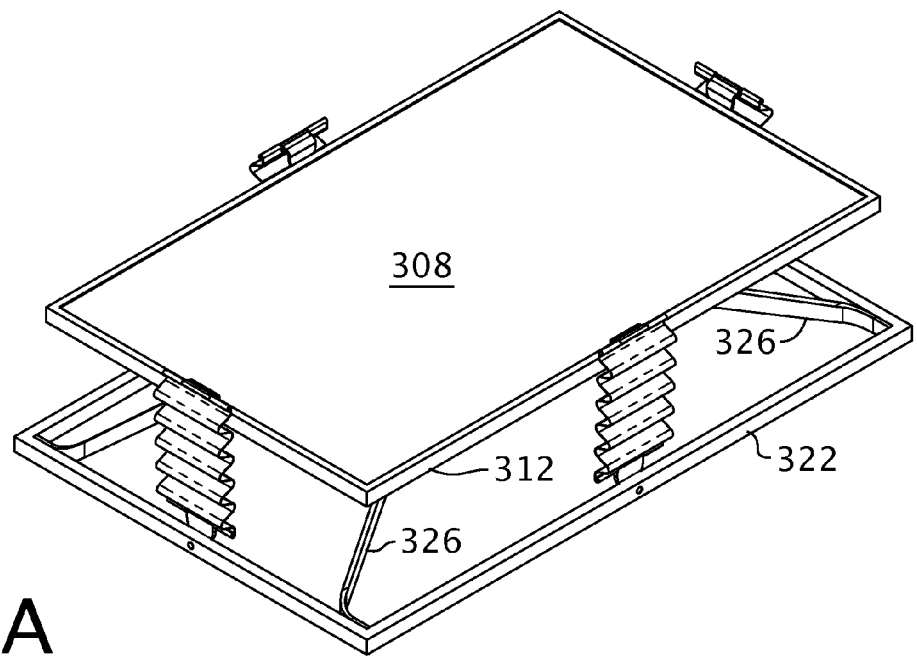
FIGS. 9 through 12 show an instance of the second embodiment, wherein the pivot mount is a universal joint rocker system.
Figure 9B:
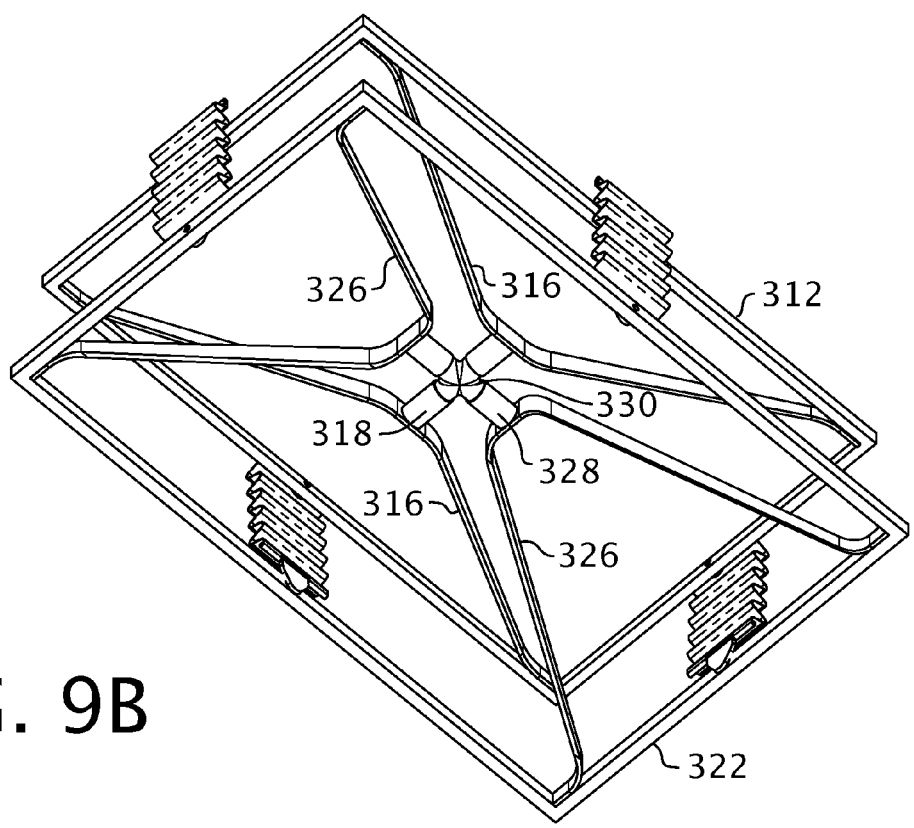

FIG. 9 shows two views of a dual-axis rocker mount in which the pivot frame assembly is in its balanced position, such as occurs either when the sun is not shining or when the direction of sunlight is perpendicular to the mount's base. FIG. 9A shows a view from above the mount, and FIG. 9B shows the mount's underside.

Figure 10:
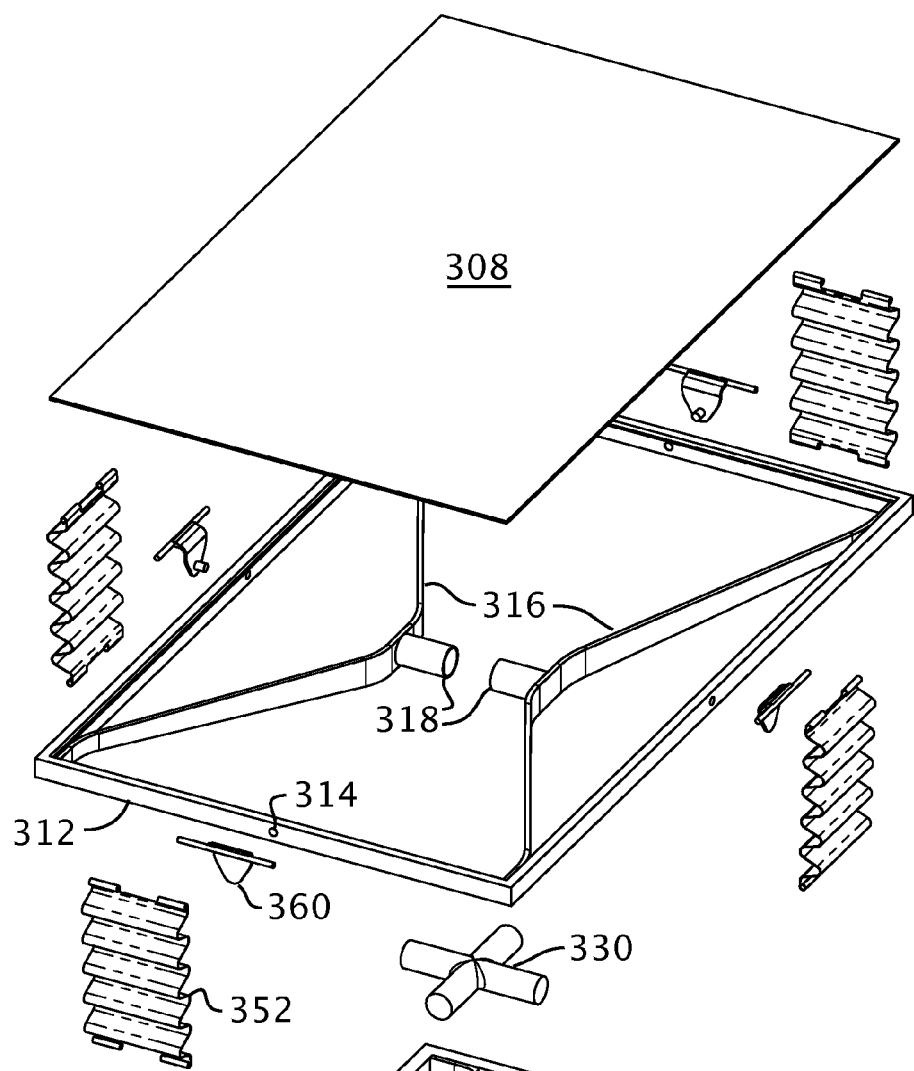
Figure 10:
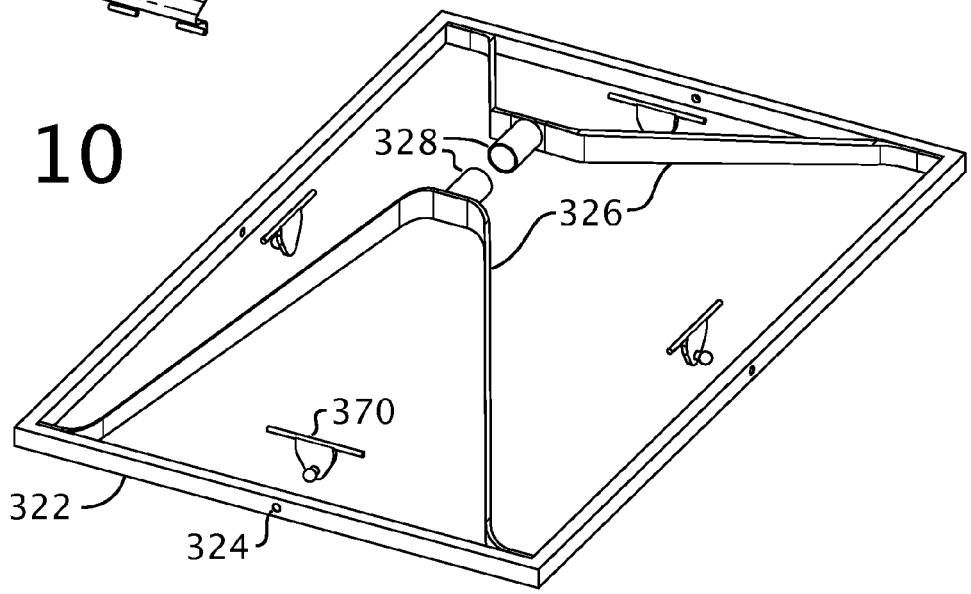

FIG. 10 shows an exploded trimetric view of the mount, in which all of the major assemblies are dis-assembled into their constituent parts.

The two-axis rocker mount comprises three rigid components that move relative to each-other, not counting solar mechanical devices: the pivot frame assembly, comprising the panel frame 312, struts 316, and axle bearing sleeves 318; the base frame assembly, comprising the base frame 322, struts 326, and axle bearing sleeves 328; and the cross axle 330. The said cross axle has two pairs of co-axial cylindrical surfaces, where the axes of the two pairs are perpendicular to each other.

The cross axle is mounted within the said bearing sleeves to form a universal joint whose one pivot axis is parallel to the short middle axis of the panel, and whose other pivot axis is parallel to the long middle axis of the base. This arrangement allows the pivot frame to pivot about two perpendicular intersecting axes relative to the base, while preventing it from twisting. The struts of the base frame assembly form a shallow elongate pyramid, while the struts of the pivot frame assembly form a shallower, inverted elongate pyramid. This arrangement efficiently distributes gravity loads from the pivot frame through the universal joint and to the base frame. The relatively short distance between the panel center and the pivot axis intersection provides the necessary clearance for components of the lower frame assembly relative to the panel when the pivot frame tilts to its maximum extents, while keeping the center of gravity of the pivot frame and panel relatively close to each other.

The midpoints of each of the four sides of the said panel frame are tensionally linked to the midpoints of the corresponding sides of the said base frame by solar mechanical devices in the form of thermal spring assemblies 350. Each said thermal spring assembly comprises a radiant energy capture spring 352, an upper spring handle 360, and a lower spring handle 370.

Figure 11:
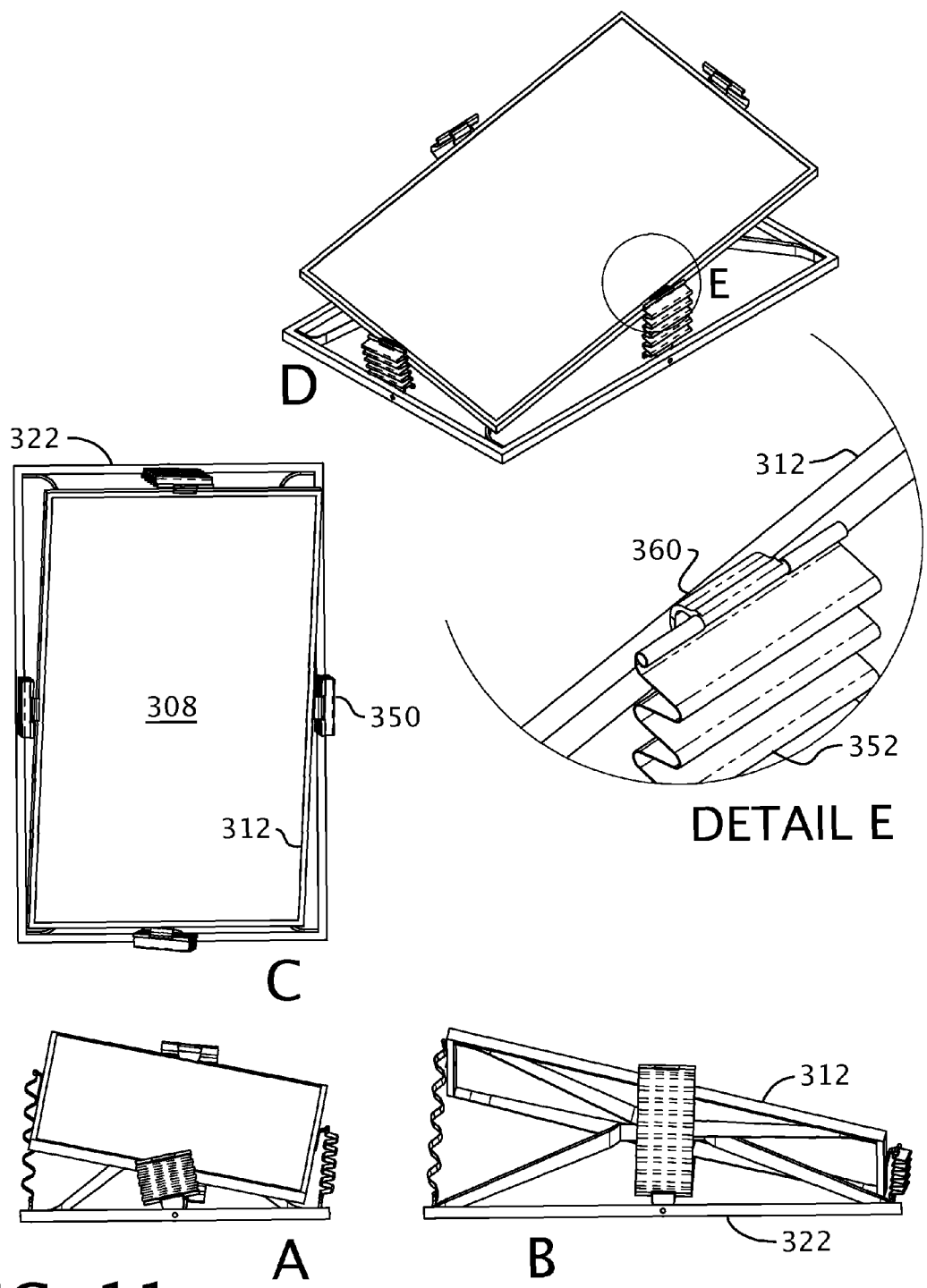

FIG. 11 shows four views and a detail magnification of a panel mount tilted about both of its pivot axes to nearly its limit of travel. FIGS. 11 A, B, and C show the mount from the three axes of the base frame, and FIG. 11 D shows an isometric view of the same. As can be seen in this figure, the thermal spring assemblies accommodate several axes of displacement and tilt between the surfaces of the pivot frame and base frame to which they articulate.

Figure 12:
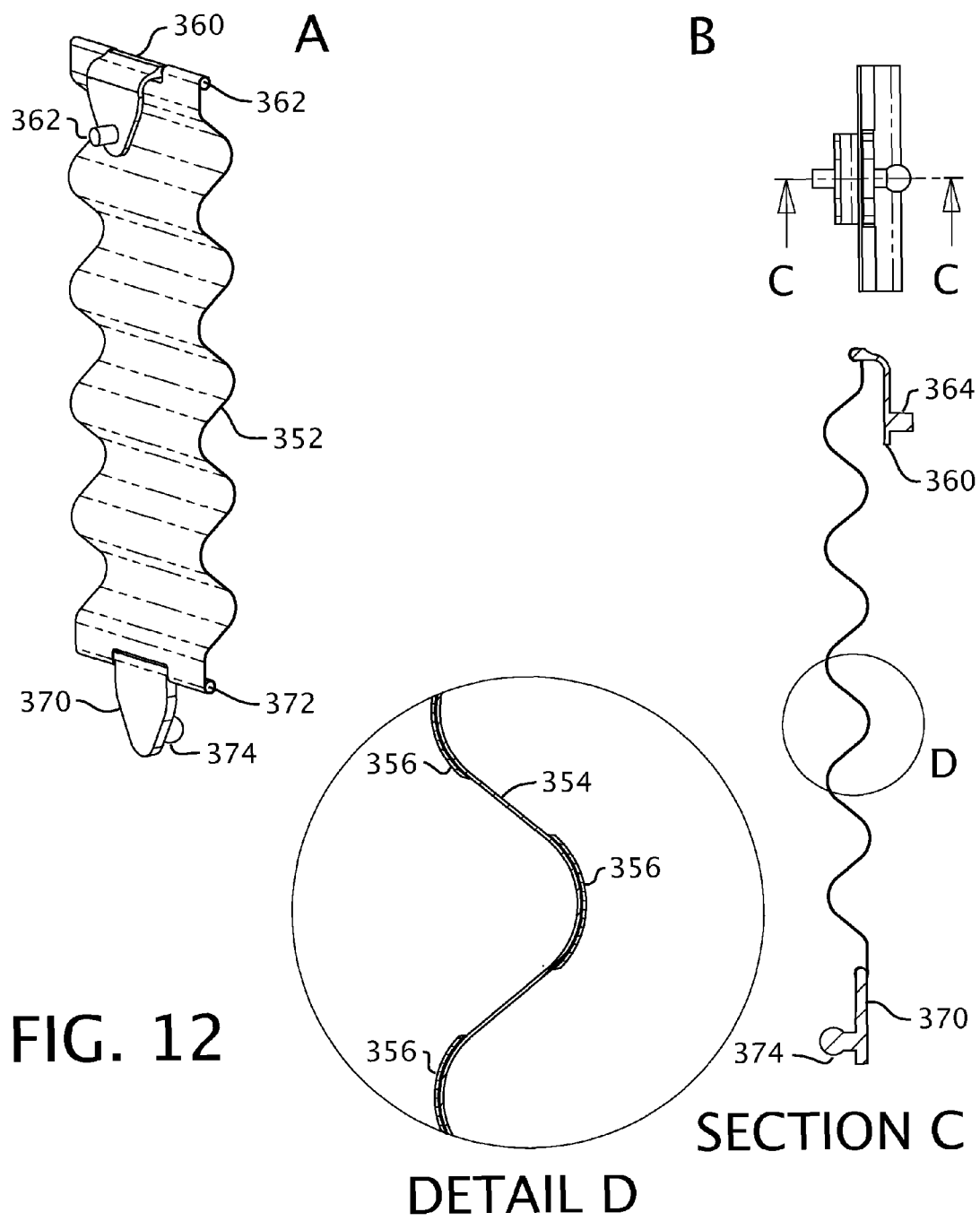

Details of the articulation of the thermal spring assemblies to the frames can be seen with references to FIGS. 10, 11, and 12. The upper spring handle 360 has the integral joint peg 364 which is pivotably mounted in the axle hole 314 of its respective pivot frame member, and the integral spring hinge axle 362 which is pivotably mounted in a loop formed by the top of the spring. In a similar fashion, the lower spring handle 370 has the integral joint ball 374 which is pivotably mounted in the ball socket 324 of its respective base frame member, and the integral spring hinge axle 372 which is pivotably mounted in a loop formed by the bottom of the spring. The flexible mounts of the upper and lower handles differ in that the upper handle allows rotation about one axis relative to its articulating frame member, and the lower handle allows rotation about multiple axes relative to its articulating frame member.

FIG. 12 shows three views of the thermal spring assembly, and a detail view. The operation of the spring, instances of which in different states of elongation can be seen in FIG. 11, can be understood with reference to the detail view in FIG. 12. The spring is formed of a flat piece of material with alternating bends and loops at each of its two ends designed to articulate with the said handles. The spring's surface is treated or painted so that its outward-facing side effectively absorbs solar radiation. The radiation absorbed by the spring, and therefore its temperature, increases as the direction of the sun approaches the spring's outward-facing side face.

The spring, when not attached to a load, changes its length in response to changes in temperature such that its length varies in inverse proportion to its temperature. This behavior is achieved by exploiting different thermal expansion coefficients of different materials. In the present embodiment, the body of the spring 354 is formed of a metal such as aluminum, and the convex sides of the springs periodic bends are laminated with a second material 356 having a very high thermal expansion coefficient. When the spring is heated, the expansion of the second material relative to the base material forces the bends to decrease in radius, thereby shortening the overall length of the spring.

Among the methods contemplated by the invention for increasing the degree to which the shape of the spring responds to variations in temperature is the use of laminating materials that have anisotropic thermal expansion characteristics. For example, a polymeric material with a very high intrinsic expansion coefficient might have a microscopic structure in which fibers or plates of a material with a low expansion coefficient run perpendicular to the material's surface, thereby preventing significant expansion of the material perpendicular to that surface and amplifying its expansion parallel to the surface.

When such a thermally responsive spring is attached to a load by tensionally connecting two points, as is the case in the spring pivot embodiment, it exerts a tensional force that is proportional to is temperature, where that tension is alleviated by the movement of the load that shortens the spring.

SUMMARY OF FEATURES OF THE EXEMPLARY EMBODIMENTS

The invention is a mounting system for solar panels that pivots the panel to decrease the difference between the panel's normal direction and the direction of sunlight. This orienting function, which is similar to that provided by conventional heliostats, is provided in the present invention through the use of solar mechanical devices that change shape in response to changes in solar illumination of certain of their surfaces.

Advantageous characteristics of the first exemplary embodiment described herein include the following:
1. When the sun is not shining, the mechanism retracts the panel into its frame such that the entire assembly has a low profile, with the surface of the panel parallel to the platform supporting the mount.
2. The mount provides robust support for the panel despite consisting of parts that are generally thin and light, and using a relatively small quantity of materials.
3. When the mount is subjected to sufficiently high winds, the mechanism retracts the panel into its frame, even when the sun is shining, minimizing the assembly's profile.
4. The mount can be configured to provide pivoting about any subset of the four possible tilt axes corresponding to a panel's four edges, and equipped with only the lifters and other components required by the operable tilt axes.

Advantageous characteristics of the second exemplary embodiment described herein include the following:
1. The mount provides robust support for the panel despite consisting of parts that are generally thin and light.
2. The solar mechanical devices are entirely solid-state and simple in construction.

The foregoing specification describes several exemplary embodiments of the invention. Those skilled in the relevant fields will be able to recognize numerous other configurations, variations, and embodiments of the invention disclosed herein.

The invention claimed is:

1. A solar panel mount that uses solar thermal energy to orient a solar panel, the solar panel mount comprising: a rectangular panel frame and a supporting rectangular pivot frame articulated to each-other by at least one pivot mechanism; the rectangular panel frame comprising: a panel frame right edge and a panel frame left edge; the rectangular pivot frame comprising: a pivot frame left edge and a pivot frame right edge; wherein the panel frame right edge and the pivot frame right edge are correspondingly positioned with respect to each other, and a first pivot mechanism comprising: a right tilt axis along the panel frame right edge that pivotally articulates the panel frame right edge with respect to the pivot frame right edge; and a solar thermal lifter of variable length having an upper articulation to the panel frame left edge, a lower articulation to the pivot frame left edge, and a lift engine comprising: a radiant energy capture paddle having a front surface configured to absorb direct incident solar energy as heat and a thermal mechanical device that lengthens the solar thermal lifter in response to temperature increases, increasing a distance between the upper and lower articulations and pivoting the solar panel about the right tilt axis.

2. The solar panel mount of claim 1, further comprising a second pivot mechanism, the second pivot mechanism comprising: a left tilt axis along the panel frame left edge that pivotally articulates the panel frame left edge with respect to the pivot frame left edge; a second solar thermal lifter of variable length having an upper articulation to the panel frame right edge, a lower articulation to the pivot frame right edge; and a second lift engine comprising: a radiant energy capture paddle having a front surface configured to absorb direct incident solar energy as heat and a thermal mechanical device that lengthens the second solar thermal lifter in response to temperature increases, increasing a distance between the upper and lower articulations and pivoting the solar panel about the left tilt axis.

3. The solar panel mount of claim 2, further comprising: a first set and a second set of constant-length straps comprising ends at anchored locations in opposite sides of the rectangular panel frame and the rectangular pivot frame, such that the first set of straps connects a left side of the rectangular panel frame to a right side of the rectangular pivot frame and the second set of straps connects a right side of the rectangular panel frame to a left side of the rectangular pivot frame, where a distance between a left and a right anchorage location for each strap remains constant as the panel pivots up on either the left tilt axis or the right tilt axis, but increases if both sides of the solar panel are simultaneously lifted; whereby a constant length of the straps constrains the panel to be in one of three operating modes at any one time: not pivoting, pivoting up about the first pivot mechanism's right tilt axis, and pivoting up about the second pivot mechanism's left tilt axis.

4. The solar panel mount of claim 1, wherein the thermal mechanical device of the lift engine further comprises: a working fluid confined within a variable-length piston assembly integral to the radiant energy capture paddle, such that the working fluid is heated by thermal energy captured by the radiant energy capture paddle, and thermal expansion of the working fluid elongates the variable-length piston assembly.

5. The solar panel mount of claim 1, wherein the solar thermal lifter further comprises: a linkage of lever arms that supports the upper and lower articulations of the solar thermal lifter to the rectangular panel frame and the rectangular pivot frame, respectively, and articulates to the lift engine, such that elongation of the solar thermal lift engine produces elongation of the solar thermal lifter that increases a distance between the solar thermal lifter upper and lower articulations.

\* \* \* \* \*